Patented Sept. 29, 1953

2,653,941

UNITED STATES PATENT OFFICE 2,653,941

3,7-DIHALO-4-HYDROXYQUINOLINES

Martin E. Hultquist, Bound Brook, and Theodore F. Scholz, Somerville, N. J., assignors to American Cyanamid Company, New York, N. Y., a corporation of Maine No Drawing. Original application June 11, 1946, Serial No. 676,088. Divided and this application May 18, 1951, Serial No. 227,122

The portion of the term of the patent subsequent to December 16, 1968, has been disclaimed 2 Claims. (Cl. 260—289)

This invention relates to new chemical compounds and a process for preparing them. More particularly the compounds are 3-haloquinolines, having substituents in the 4 and 7 positions, which may be prepared by our methods by direct and comparatively simple and low priced procedures. This application is a division of our application, Serial No. 676,088 filed June 11, 1946, now Patent Number 2,579,320.

Compounds made in accordance with this invention may be designated by the formula

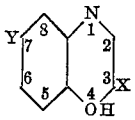

where X and Y are halogens.

The reactivity of the halogen also opens up new fields of endeavor in the preparation of new and useful compounds. Our compounds are useful as pharmaceuticals and pharmaceutical intermediates, some of which possess antimalarial characteristics, in addition to other useful properties.

The presence of the halogen in the molecule affects the potency of certain antimalarial compounds.

The invention may be illustrated more clearly in detail by the following specific example.

Example

A reaction mixture containing sodium formylchloracetic ester is prepared by reacting together one mole each of methyl formate, sodium methylate and methyl monochloroacetate after the method described by Wislicenus, Berichte 43, 3530 (1910). The material as so prepared is diluted to 1.5 liters with ice. The thus chilled solution is then run slowly with stirring, into a mixture consisting of 1.5 liters of water, 100 grams of 36% hydrochloric acid, 127 grams of meta-chloroaniline and 500 grams of ice. When the two solutions have been mixed the white slurry is stirred for about an hour to insure completion of the reaction. The m-chloroanil is separated by filtration, washed with water and diluted alcohol. After drying, the yield of the pure anil is about 155 grams, or 75% of theoretical (M. P. 112.6–113.2° C.) The anil is N[2-carbomethoxy-2-chloroethylidine]m-chloroaniline,m-ClC$_6$H$_4$N:CHCHClCOOCH$_3$ or a tautomer thereof, but is more conveniently referred to as the m-chloroanil of formylchloracetic methyl ester.

100 grams of this m-chloroanil of formylchloroacetic ester is dissolved in 25 ml. of the eutectic mixture of biphenyl and diphenyl ether by warming to about 100° C. The warm solution is then added rapidly to 275 ml. of the same solvent heated to 245° C. The charge is heated to the boiling point, (250–260° C.) and held for one-half hour at this temperature during which period a small amount of distillate is taken off. The charge is then cooled to 25 to 30° C. and stirred for sufficient time to allow complete crystallization of the product from the solution which is then removed by filtration. The dark presscake from the filter is washed with a small amount of a solvent such as benzene. The product is then purified by reslurrying in hot benzene. The product formed is 3,7-dichloro-4-hydroxyquinoline, which is comparatively insoluble in hot benzene and thus readily purified. After recrystallization the material is found to have a melting range of 313–315° C. (uncorrected).

Our process as exemplified above may be used with the sodium-formylbromoacetic ester, or other alkali formylhaloacetic ester but normally the chloracetic ester is preferred because of economic considerations. The aniline should be substituted in the meta position to give the most desirable results. The meta substituent may be chlorine, bromine, or other halogen or a methyl group or ethyl group or other low alkyl radical, or methoxy or ethoxy or other low alkoxy radical. The ester used is normally a sodium formylchloroacetic ester, preferably the methyl ester; however, the ethyl ester or other low aliphatic ester may be used, as well as bromo, or other halogen.

Various solvents may readily be used for the ring closure step. Diphenyl ether, biphenyl, mineral oil, or mixtures may be used. The solvent, or vehicle should be relatively stable, to stand the temperature of the reaction, and is preferably of a comparatively high boiling point, although a more volatile solvent may be used in a pressure vessel. The solvent must be free from reactive groups such as hydroxy groups, ester groups, etc., which might react with one of the components of the mixture, or which might decompose under the reaction conditions.

The temperature at which the anil is heated to close the ring is important, but not particularly critical. By heating to about 300° C., as by using a different solvent, or an autoclave with the eutectic mixture, the ring closure will take place much more rapidly. If heated to only about 200° C., the ring closure takes place, but slowly. The time of heating must be correlated with the temperature in order that substantially all of the anil reacts, but still, the conditions are not sufficiently drastic to cause undue decomposition. The removal of the alcohol formed assists in stabilization of conditions. Closure at the temperature of boiling of the eutectic mixture, at atmospheric pressure, permits a most convenient and economical process. It is usually more efficient and economical to use from 2 to 50 parts of inert solvent per part of the anil in the ring closure step.

In our compounds the 3 and the 7 halo linkages are comparatively stable.

Having thus disclosed certain examples thereof, as our invention we claim:

1. A 3,7-dihalo-4-hydroxyquinoline.

2. The compound 3,7-dichloro-4-hydroxyquinoline.

MARTIN E. HULTQUIST.
THEODORE F. SCHOLZ.

References Cited in the file of this patent
UNITED STATES PATENTS

| Number | Name | Date |
|---|---|---|
| 2,579,320 | Hultquist | Dec. 18, 1951 |

OTHER REFERENCES

Beilstein: "Handbuch der Organischen Chemie," vol. 20, p. 362 (1935); vol. 21, pp. 80, 81, 88 and 95 (1935); suppl. vol. 20–22, page 222 (1935).